G. T. WILLIAMS.
RECORD PACKET.
APPLICATION FILED FEB. 4, 1908.
911,794.
Patented Feb. 9, 1909.
2 SHEETS—SHEET 1.
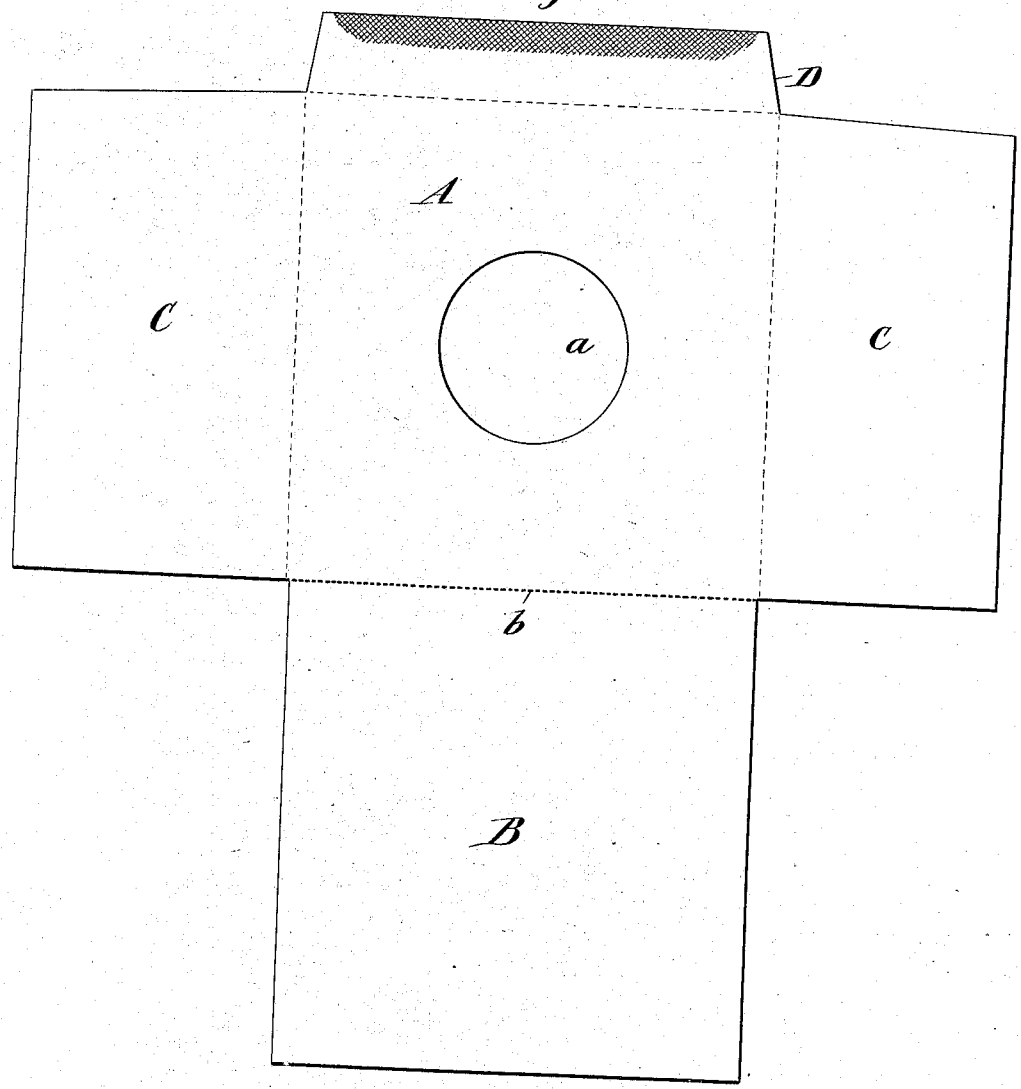
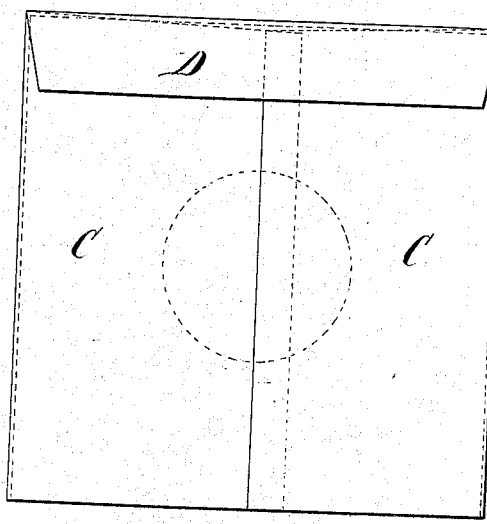
Witnesses:
F. J. Greene.
H. J. Petersen.
Inventor:
George T. Williams,
by his attorney,
Charles R. Searle.

G. T. WILLIAMS.
RECORD PACKET.
APPLICATION FILED FEB. 4, 1908.
911,794.
Patented Feb. 9, 1909.
2 SHEETS—SHEET 2.
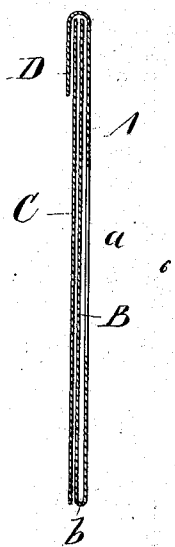
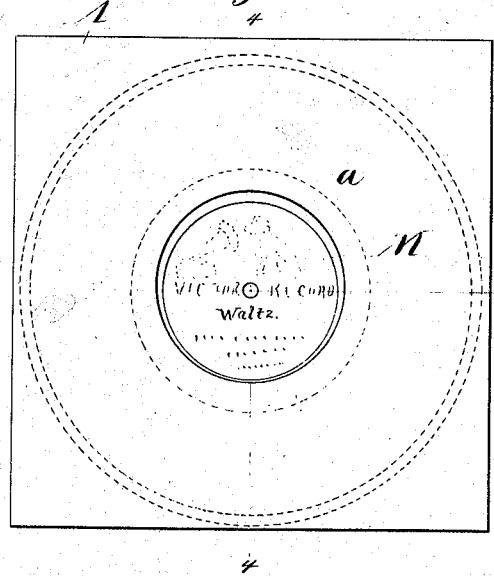
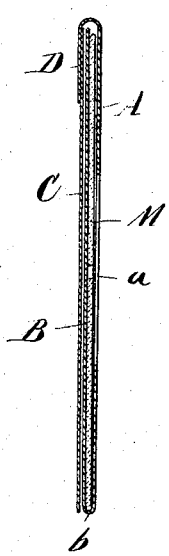
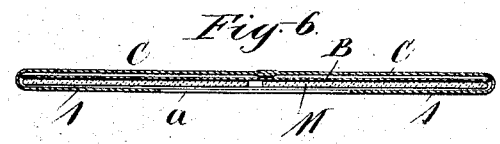
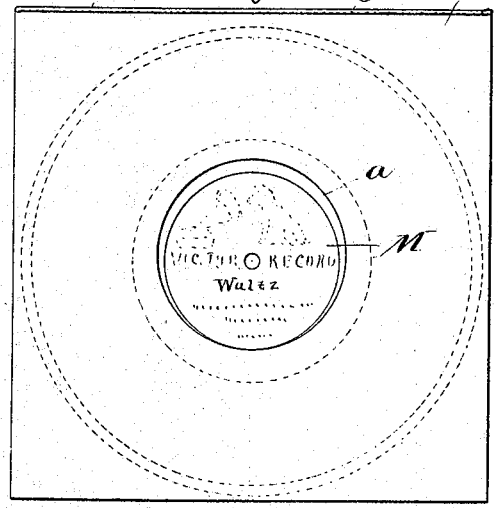
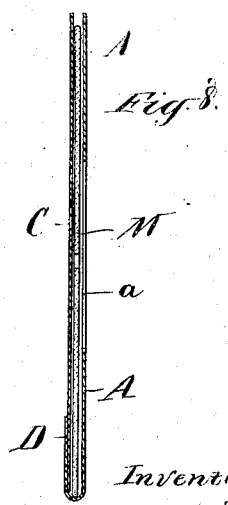
Witnesses:
F. J. Greene
H. J. Petersen
Inventor:
George T. Williams
by his attorney,
Charles K. Searle

UNITED STATES PATENT OFFICE.

GEORGE T. WILLIAMS, OF NEW YORK, N. Y.

RECORD-PACKET.

No. 911,794.   Specification of Letters Patent.   Patented Feb. 9, 1909.

Application filed February 4, 1908. Serial No. 414,175.

*To all whom it may concern:*

Be it known that I, GEORGE T. WILLIAMS, a citizen of the United States, residing in the city of New York, borough of Manhattan, in the county and State of New York, have invented a certain new and useful Improvement in Record-Packets, of which the following is a specification.

The invention relates to envelops adapted to serve in containing disk records for talking machines, and the object of the invention is to provide a simple inexpensive packet so constructed as to permit the retailer to deliver the desired record to the consumer in an envelop of the form usually employed in the trade, and so constructed as to show whether or not the record has been removed from the packet as originally received by the retailer from the manufacturer or distributer.

The consumer is accustomed to receiving the record in a simple bag-like envelop without flaps, and it has been the custom in the trade to deliver the record thus inclosed to the retailer; under this system "returns" by the retailer could not be credited for the reason that no assurance could be given that the records thus returned had not been played and thereby impaired in value. By the use of the present invention the envelops show whether or not the records have been removed, and such as do not bear evidence of removal may be returned and exchanged or credit given therefor.

The invention consists in certain novel features and details of construction and arrangement by which the above objects are attained, to be hereinafter described and pointed out in the claims.

The accompanying drawings form a part of this specification and show an approved form of the invention.

Figure 1 is a face view of the blank or sheet of paper before folding to form the envelop. Fig. 2 is a view of the rear face of the completed envelop. Fig. 3 is a similar view of the front face with a record inclosed, forming the packet as received by the retailer. Fig. 4 is a corresponding section on the line 4—4 in Fig. 3. Fig. 5 is a similar section showing the envelop before the introduction of the record. Fig. 6 is a transverse section taken on the line 6—6 in Fig. 3. Fig. 7 is a view of the front face of the envelop in the condition in which it is delivered to the consumer with its contained record. Fig. 8 is a corresponding section on the line 8—8 in Fig. 7. Fig. 9 is a similar section showing the empty envelop.

Similar letters of reference indicate the same parts in all the figures.

A is the front of the envelop having a circular opening $a$ therein, B is a protective-flap forming part of the same sheet and adapted to be folded on the rear face of the front A to which it corresponds in its dimensions, the folding line having a series of perforations $b$ to facilitate separation along such line.

C C are side flaps or wings folded one upon the other to inclose the protective-flap and gummed at their overlapping edges, and D is the closing flap gummed on its inner margin and adapted to close the envelop by adhesion to the upper ends of the wings C C.

The record M is inserted in the pocket formed by the front A and protective-flap B, before the closing flap is gummed down, and with the label bearing the title of the record exposed through the opening $a$, the closing flap is then moistened and gummed to seal the packet. In this condition the record is received by the retailer. On call of a consumer to hear the record preliminary to purchasing, the retailer severs the protective-flap B from the front A along the line of perforations $b$, draws out and discards the protective-flap, removes the record from the bag-like envelop now remaining, and plays it; if the consumer purchases the record, the latter is replaced in the same envelop with the protective-flap omitted, and thus delivered in the form of envelop to which the consumer is accustomed. In case the consumer does not buy, the record is similarly replaced and laid in stock and may be used for demonstration to another consumer. Such envelops as have the protective-flap intact and undisturbed may be returned to the manufacturer or distributer and full credit given therefor as it is evident they have not been played.

By forming the protective-flap of nearly or quite the same dimensions as the front A, and making the envelop just large enough to receive the record, renders it practically impossible to remove and replace the flap as would be required in the removal and replacement of the record, and forms an exceedingly inexpensive but effective sealing means. The line of perforations $b$ increases the difficulty of such removal and replacement by the liability to tear along such line and thus indicate the infraction.

Although I have described the invention as applied to the distribution of talking-machine records, it will be understood that it will serve with other articles to which it may be adapted.

The envelop may be varied in size and in the proportions of its parts; the protective-flap must be in all cases of such size relatively to the front as to preclude its removal and refolding. The perforations $b$ may be omitted.

I claim:—

1. The envelop described, comprising a front, a protective-flap corresponding in dimensions to said front and folded upon the interior face thereof and terminating within the same, side wings on said front folded one upon the other and gummed together on their overlapping margins, and a closing flap on said front opposite to said protective-flap, all arranged to serve with a disk record matching to and received in said envelop.

2. The envelop described, comprising a front having an opening therein, a protective-flap corresponding in dimensions to said front, folded upon the interior face of the latter and terminating within the same and having a series of perforations along such folding line, side wings on said front folded one upon the other and gummed together on their overlapping margins, and a closing flap on said front opposite to said protective-flap, all arranged to serve with a disk record matching to and received in said envelop.

3. In a record packet, an envelop comprising a front having an opening therein, a protective-flap corresponding in dimensions to said front, folded upon the interior face of the latter and terminating within the same and having a series of perforations along such folding line, side wings on said front folded one upon the other and gummed together on their overlapping margins, and a gummed closing flap on said front opposite to said protective-flap, in combination with a disk record received in said envelop between the interior face of said front and said protective-flap, all substantially as and for the purposes set forth.

4. As an improved article of manufacture, the envelop described, comprising a front, an integral protective-flap corresponding in dimensions to said front and folded upon the interior face thereof, side wings on said front folded one upon the other and gummed together on their overlapping margins, said side wings embracing and concealing the free end of the protective-flap, and a closing flap on said front opposite to said protective-flap and engaging said front independent of the protective-flap, said front having an opening therein.

5. As an improved article of manufacture, the envelop described, comprising a front, an integral protective-flap corresponding in dimensions to said front and folded upon the interior face thereof, side wings on said front folded one upon the other and gummed together on their overlapping margins, said side wings embracing and concealing the free end of the protective-flap, and a closing flap on said front opposite to said protective-flap and engaging said front independent of the protective-flap, said front having an opening therein, in combination with a disk record received in said envelop between the interior face of said front and said protective-flap with a portion exposed through the opening in the front, there being a line of perforations between the protective-flap and the front against which the disk record bears.

In testimony that I claim the invention above set forth I affix my signature, in presence of two witnesses.

GEORGE T. WILLIAMS.

Witnesses:
CHARLES LEE MEYERS,
CHARLES R. SEARLE.